F. A. MARCHER.
MOUNTING FOR EYEGLASSES.
APPLICATION FILED SEPT. 6, 1907.
1,032,488.
Patented July 16, 1912.
Fig. 1.
Fig. 2.
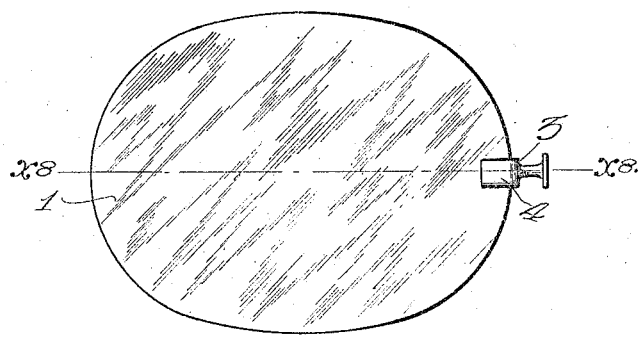
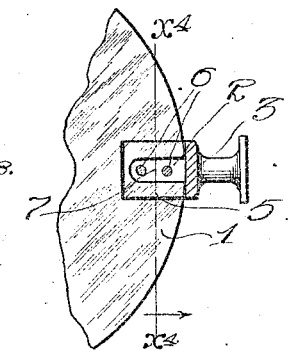
Fig. 3.
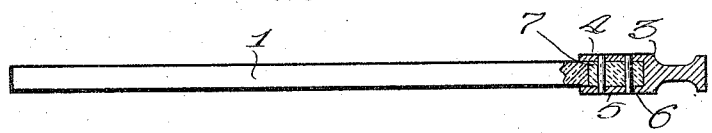
Fig. 4.
Fig. 9.
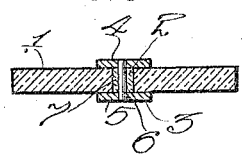
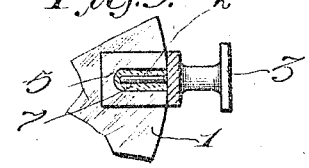
Fig. 5.   Fig. 6.   Fig. 7.
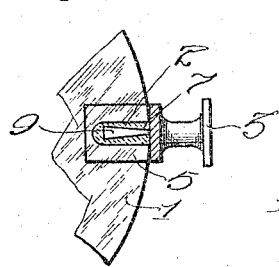
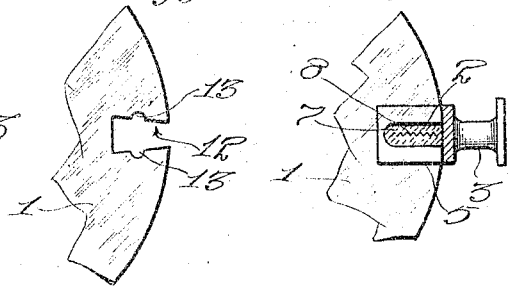
Fig. 8.
Witnesses:
C. J. Williams
M. O. Townsend
Inventor
Frank A. Marcher
by James R. Townsend
his Atty

UNITED STATES PATENT OFFICE.

FRANK A. MARCHER, OF LOS ANGELES, CALIFORNIA.

MOUNTING FOR EYEGLASSES.

1,032,488.   Specification of Letters Patent.   Patented July 16, 1912.

Application filed September 6, 1907. Serial No. 391,729.

*To all whom it may concern:*

Be it known that I, FRANK A. MARCHER, a citizen of the United States, residing at Los Angeles, in the county of Los Angeles and State of California, have invented a new and useful Mounting for Eyeglasses, of which the following is a specification.

This invention has for its object the provision of means for uniting optical rimless lenses with their mountings without weakening the lenses by drilling holes therethrough, and employing screws as retaining medium.

Another object of this invention is to prevent the accidental breaking of the lenses by the use of screws which, when screwed home too tightly, chip the glass or destroy the holes previously drilled for the reception of the screws, and to keep the metal of the mounting out of contact with the glass thereby to prevent chipping of the lens as well as any looseness of the union or joint occasioned by much handling.

Another object of the invention is to provide means for fastening lenses to mounts whereby drilling of holes and incidental breaking caused by such drilling is obviated and the metallic portions of the mount always kept away from contact with the glass surfaces.

Specifically, my object is to provide an eyeglass construction in which the lenses are connected to the mountings by a comparatively large body of material which is plastic when applied, and which will harden and form a comparatively perfect bond between the lens and the mountings; and my invention includes the combination with a lens having a seat and a mounting having a seat, of hardened plastic material forming a bond between the seat of the lens and the seat of the mounting and fastening means passing crosswise through the cement body and the mounting and wholly out of contact with the glass.

The accompanying drawings illustrate the invention.

Figure 1 is a front elevation of a lens showing the mount attached. Fig. 2 is a fragmentary plan showing one-half of the stud attached to the lens. Fig. 3 is an end elevation showing the stud in mid-section and the cement laterally in the slot of the lens. Fig. 4 is a section on line $x^4$—$x^4$, Fig. 2. Fig. 5 is a fragmentary plan, showing a modified method of securing the stud in the body of cement by means of a wedge shaped tongue, the stud being shown partly in section. Fig. 6 is a fragmentary view of the lens showing a different form of slot. Fig. 7 is a fragmentary plan showing a modified method of securing the stud in the body of cement by means of a corrugated tongue. Fig. 8 is a fragmentary section on line $x^8$—$x^8$, Fig. 1. Fig. 9 is a fragmentary plan showing a modified method of securing the stud in the body of cement by means of a straight tongue.

1 designates a lens provided with a slot 2; 3 is a furcated stud provided with two prongs or furcations 4 and 5.

6 designates rivets which extend through and form a binding means to prevent the spreading of the furcations of the stud, when for any reason pressure is exerted on the same. The furcations 4 and 5 of the stud 3 are adapted to fit over the two opposite surfaces of the lenses at a point where the slot 2 is provided, and the rivets 6 or reinforcing members which span the distance between the furcations are adapted to embed themselves in the cement 7 placed in the slot 2 of the lens. In this manner the hardening or solidification of the cement, in the slot of the lens and about the rivets of the stud makes a firm and rigid union between the mounting and the lenses of the eye-glass. The fitting of the mounting in the cement receiving slot causes an expansion of the same laterally, so that the prongs or furcations 4 and 5 of the stud 3 are in contact with the cement body instead of resting upon the surface of the lens. In this manner the mounting or stud is so intimately united with the lens that vertical strains and lateral strains are entirely absent. Instead of employing the rivets 6 which connect the two prongs or furcations of the stud, a corrugated tongue 8 seen in Fig. 7, may be employed which tongue is provided centrally of the furcations of the stud, and which upon the application of the mounting to the glass forces its way through the cement which upon hardening firmly holds the mounting and tongue in place.

9 designates another method of providing a securing means for the mounting of the glass, this means consisting of a wedge shaped member seen in Fig. 5, which extends centrally of the stud and into the body of cement which is placed in the slot of the lens, in this manner making the removal of the lens almost impossible without destroying the same.

The nature of the cement, or the various ingredients composing the same is immaterial so long as the solidification of the plastic mass forms as perfect a hold for the mount as a solid.

In some instances on account of the difference in the thickness of the edges of the lenses and the center, as in case of near sighted concaved lenses, it may be necessary to employ a screw 11 seen in Fig. 8 extending through an orifice provided in one of the furcations, and engaging a screw threaded orifice in the other furcation, for the purpose of drawing the furcations close against the lens while the cement in the slot of the lens is hardening. The screw serves the further function of forming a reinforcement about which the cement hardens to rigidly unite the lens and stud.

The shape of formation of the slot in the lens is merely a matter of choice or calculation to determine the particular form of slot which will form the strongest medium of retention for the cement filler that is to be placed in the slot, consequently I do not limit myself to the slots shown in the accompanying drawings.

In Fig. 6 I have illustrated one of those forms of slots which is wedge shaped, as seen at 12, the greatest width of the wedge slot being toward the center of the lens, thereby causing the body of cement to assume the shape of the wedge, and when the stud together with its reinforcing struts is embedded in said body of cement, the consequent hardening of the cement makes the wedge practically solid, and the union between the lens and the mount almost perfect. If desired I may provide in the slot a notch or plurality of notches, as shown at 13, in order to increase the rigidity of the cement hold, and to absolutely prevent the removal of the cement body from its seat.

This invention is also applicable to use in connection with the uniting of metal substances with vitreous or other substances of a like nature and I therefore do not restrict this invention to lenses and mounts therefor, it being understood that wherever a union or joint between metallic and silicious substances is required, this invention may be used with equal effect.

In practical operation I have produced an eyeglass in which the lens is connected to the mount by a hardened plastic material forming a perfect bond between a seat in the lens and a seat in the metallic frame; the body of the plastic material being large enough to stand the strain by itself so as to completely relieve the lens of all pressure and contact and influence from the metallic mount. It is important in forming the slot 2 in the lens that the length of the slot from the periphery of the lens shall be a great deal more than the width of the slot so that the plastic material will find a firm seat and form a perfect bond with the glass; and it is important that the seat in the stud between the prongs 4 and 5 and around the screws or rivets shall be spread over considerable surface so that the plastic material will form a perfect bond with the stud. In other words, it is important to provide space of and shape to receive a sufficient quantity of plastic material so that when it hardens the plastic material will have sufficient strength by itself to form the union between the metal and the glass. The rivets and preferably not less than a third of the width of the prongs along practically their entire length are out of contact with the glass and any axis passing crosswise through such portions of the mount and through the body of hardened plastic material will not pass through the glass, so that pressure between the prongs by tightening the rivets, screws or struts, or due to heat and cold and other causes, will pass through the plastic material and will not pass through the glass.

I am aware that rimless eyeglasses have been connected to their mounts by inserting cement between the metal and the glass, as in the Patent to Dunham No. 82,930, dated Oct. 13, 1868; but in these constructions the metal fits closely to the glass and only a comparatively small quantity of cement can be used, and the strain of the metal comes directly upon the glass so as to cause much loss by breaking the lenses. Consequently, I do not desire to claim broadly the idea of cementing lenses to frames.

What I claim is:—

1. The combination with a glass having a seat and a metallic frame having a seat, of hardened plastic material connecting the seat of the glass to the seat of the frame, and fastening means passing crosswise through the metallic frame and through the body of hardened plastic material and out of contact with the glass.

2. The combination with a glass having an elongated slot to form a seat, and a frame having bifurcations and rivets connecting the bifurcations to form a seat, hardened plastic material forming a complete bond between the glass and the frame and connecting the seat in the glass to the seat in the frame and forming a seat, to receive and hold fastening means, and fastening means passing crosswise through the metallic frame and through the body of hardened plastic material without contacting with the glass.

3. In an eye-glass mount, the combination of a lens having a lateral slot in one end, hardened plastic material seated in said slot, a bifurcated frame seated on said plastic material, and fastening means connected to the frame and embedded in the plastic material in the slot.

In testimony whereof, I have hereunto set my hand at Los Angeles, California, this 31st day of August 1907.

FRANK A. MARCHER.

In presence of—
JAMES R. TOWNSEND,
ANTON GLOETZNER.

Copies of this patent may be obtained for five cents each, by addressing the "Commissioner of Patents, Washington, D. C."